United States Patent
Regan et al.

(10) Patent No.: US 11,279,011 B1
(45) Date of Patent: Mar. 22, 2022

(54) NEGATOR SPRING TOOL FOR PARATROOP DOOR

(71) Applicant: The Government of the United States of America, as represented by the Secretary of Homeland Security, Washington, DC (US)

(72) Inventors: Mary Shalane Regan, Groton, CT (US); James P. Sullivan, Elizabeth City, NC (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/320,072

(22) Filed: May 13, 2021

Related U.S. Application Data

(60) Provisional application No. 63/092,292, filed on Oct. 15, 2020.

(51) Int. Cl.
  *B25B 27/30* (2006.01)
  *E05D 13/00* (2006.01)
  *B64C 1/14* (2006.01)

(52) U.S. Cl.
  CPC .......... *B25B 27/306* (2013.01); *B64C 1/1423* (2013.01); *E05D 13/1284* (2013.01); *E05Y 2900/502* (2013.01)

(58) Field of Classification Search
  CPC ....... B25B 27/26; B25B 27/30; B25B 27/304; B25B 27/306; B25B 33/00; E05Y 2900/502; E05Y 2201/492; E05D 13/1284; B64C 1/1423; Y10T 29/53613
  USPC ........ 29/896.91, 896.9, 229, 227, 225, 228; 254/10.5; 81/176.15, 488
  See application file for complete search history.

(56) References Cited

U.S. PATENT DOCUMENTS

| | | | | |
|---|---|---|---|---|
| 2,405,462 A | * | 8/1946 | Stair ....................... | B25B 13/06 76/114 |
| 4,253,350 A | * | 3/1981 | De Tarr ................. | B25B 25/00 81/486 |
| 5,113,561 A | * | 5/1992 | Scott ..................... | B25B 27/302 29/227 |

(Continued)

FOREIGN PATENT DOCUMENTS

WO    WO-2007032726 A2 *    3/2007   ............. B25B 13/46

*Primary Examiner* — Tyrone V Hall, Jr.
*Assistant Examiner* — Makena S Markman
(74) *Attorney, Agent, or Firm* — Lavanya Ratnam; Kelly G. Hyndman; Robert W. Busby

(57) ABSTRACT

In an example, a negator spring tool for winding a negator spring output drum around a rotational axis includes: a pair of tool handles; and a tool disk having an outer edge which is generally circular except for a cutout forming a portion of the outer edge as a cutout edge portion of the outer edge. The tool disk is configured to be releasably attached to the output drum. The tool disk has a drum-facing side which includes protruding teeth protruding from the drum-facing side to engage radial spokes of the output drum when they are pushed into the output drum and the tool disk is rotated in either circumferential direction around the rotational axis. The outer edge of the tool disk includes handle slots which are spaced circumferentially. The distal end of each tool handle is insertable into a handle slot to rotate the tool disk around the rotational axis.

20 Claims, 14 Drawing Sheets

(56) References Cited

U.S. PATENT DOCUMENTS

| | | | | |
|---|---|---|---|---|
| 5,605,079 A * | 2/1997 | Way | ................ | B25B 27/30 |
| | | | | 81/176.3 |
| 5,829,896 A * | 11/1998 | Cain, Jr. | ............ | B25B 27/304 |
| | | | | 400/491.2 |
| 6,240,611 B1 * | 6/2001 | Chase | ................ | B25B 27/30 |
| | | | | 29/228 |
| 6,263,541 B1 * | 7/2001 | Scates | ............. | E05D 13/1261 |
| | | | | 16/197 |
| 6,502,281 B2 * | 1/2003 | Foucault | .......... | E05D 13/1261 |
| | | | | 16/197 |
| 6,564,679 B1 * | 5/2003 | Llamas | .............. | B25B 13/02 |
| | | | | 81/124.2 |
| 6,609,281 B2 * | 8/2003 | Morrison | ............. | B25B 27/24 |
| | | | | 29/227 |
| 6,988,527 B2 * | 1/2006 | Savard | ............ | E05D 13/1261 |
| | | | | 160/191 |
| 8,826,780 B1 * | 9/2014 | Alho | ................ | B25B 13/50 |
| | | | | 81/176.15 |
| 2008/0006127 A1 * | 1/2008 | Marasco | ............. | B25B 13/50 |
| | | | | 81/124.2 |
| 2015/0075336 A1 * | 3/2015 | Hamman | ........... | B25B 21/002 |
| | | | | 81/462 |

* cited by examiner

LH SIDE SHOWN
RH SIDE SIMILAR

BEFORE WINDING ONTO STORAGE DRUM

AFTER WINDING ONTO STORAGE DRUM

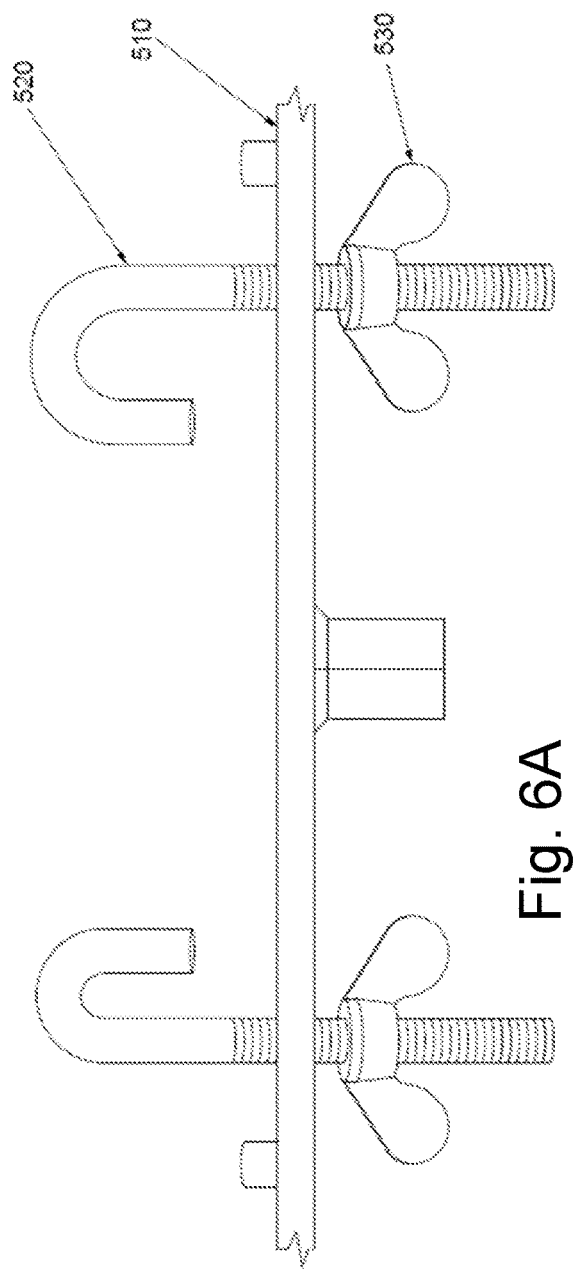
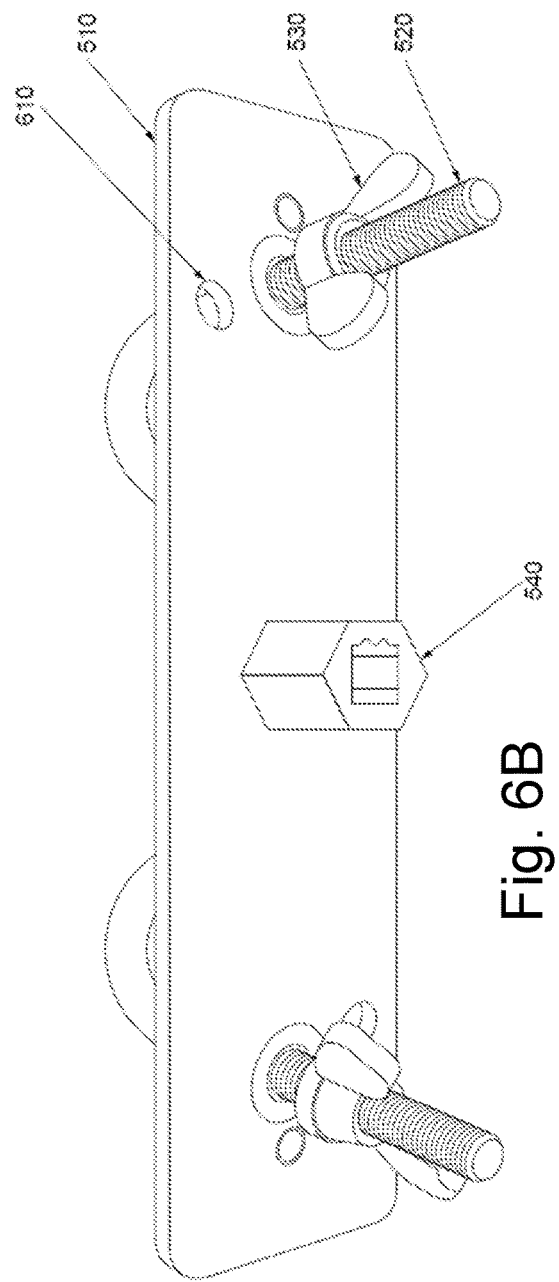
Fig. 6A
Fig. 6B

NEGATOR SPRING TOOL FOR PARATROOP DOOR

CROSS-REFERENCE TO RELATED APPLICATIONS

The application is a nonprovisional of and claims the benefit of priority from U.S. Provisional Patent Application No. 63/092,292, filed on Oct. 15, 2020, entitled NEGATOR SPRING TOOL FOR PARATROOP DOOR, the disclosure of which is incorporated by reference in its entirety.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to apparatuses and methods of manipulating a negator spring assembly to provide counterbalance for an object such as a paratroop door.

BACKGROUND

An aircraft paratroop door may have a mechanism that assists an operator in opening or closing the door to allow occupants of the aircraft to exit during flight. The mechanism may have a negator spring that assists the operator by providing a biasing force that counterbalances the weight of the door. The strong force applied by the negator spring, however, may endanger personnel who are to maintain the door, the negator spring, and the mechanism by which the negator spring applies the force to the door.

SUMMARY

Embodiments of the present invention are directed to apparatuses and methods for manipulating a negator spring assembly to provide counterbalance for an object such as a paratroop door. A negator spring tool is used to wind or unwind a negator spring in the paratroop door negator spring counterbalance mechanism. The negator spring tool includes a tool disk having a plurality of handle slots spaced along the circumference of an outer edge for receiving two tool handles. The tool disk is pushed partially into a negator spring output drum to releasably engage the tool disk with the output drum. The output drum can be rotated in one direction to wind the negator spring in tension or in the opposite direction to unwind the negator spring. Once the tool disk is coupled with the output drum, the operator or user has both hands free and can use both hands to operate the two tool handles to rotate the tool disk and the output drum coupled thereto. The winding or unwinding of the negator spring is done incrementally. After each incremental rotation, one tool handle is pulled out of the handle slot and inserted into the next open handle slot. In this way, the user keeps at least one tool handle under hand grip at all times to maintain control of the winding position of the negator spring. This prevents catastrophic release of the energy stored in the winding of the negator spring, which enables safe and easy winding or unwinding and installation or removal of the negator spring.

An aspect is directed to a negator spring tool for winding a negator spring output drum having a plurality of radial spokes around a pulley shaft which extends through a center of the negator spring output drum along a rotational axis. The negator spring tool comprises: a pair of tool handles, each tool handle having a distal end; and a tool disk having an outer edge which is generally circular except for a cutout forming a portion of the outer edge as a cutout edge portion of the outer edge, the tool disk being configured to be releasably attached to the negator spring output drum, the tool disk having a drum-facing side which includes a plurality of protruding teeth arranged circumferentially and protruding from the drum-facing side to engage the radial spokes when the protruding teeth are pushed into an interior of the negator spring output drum and the tool disk is rotated in either circumferential direction around the rotational axis extending through the center of the negator spring output drum and a center of the tool disk, the outer edge of the tool disk including a plurality of handle slots which are spaced circumferentially along the outer edge. The distal end of each tool handle is insertable into any of the handle slots of the tool disk to rotate the tool disk in a circumferential direction around the rotational axis.

Another aspect is directed to a method for winding a negator spring output drum having a plurality of radial spokes around a pulley shaft which extends through a center of the negator spring output drum along a rotational axis. The method comprises: releasably attaching a drum-facing side of a tool disk to the negator spring output drum, the tool disk having an outer edge which is generally circular except for a cutout forming a portion of the outer edge as a cutout edge portion of the outer edge, the drum-facing side including a plurality of protruding teeth arranged circumferentially and protruding from the drum-facing side to engage the radial spokes when the protruding teeth are pushed into an interior of the negator spring output drum and the tool disk is rotated in either circumferential direction around the rotational axis extending through the center of the negator spring output drum and a center of the tool disk, the outer edge of the tool disk including a plurality of handle slots which are spaced circumferentially along the outer edge; releasably inserting a distal end of a first tool handle into a first handle slot of the tool disk and using the first tool handle to rotate the tool disk and the negator spring output drum in a circumferential direction around the rotational axis; releasably inserting a distal end of a second tool handle into a second handle slot of the tool disk; removing the distal end of the first tool handle from the first handle slot of the tool disk; and using the second tool handle to rotate the tool disk and the negator spring output drum in the circumferential direction around the rotational axis.

Yet another aspect is directed to a negator spring tool for winding a negator spring output drum having a plurality of radial spokes around a pulley shaft which extends through a center of the negator spring output drum along a rotational axis. The negator spring tool comprises: a pair of tool handles, each tool handle having a distal end; a tool disk having an outer edge which is generally circular except for a cutout forming a portion of the outer edge as a cutout edge portion of the outer edge, the outer edge of the tool disk including a plurality of handle slots which are spaced circumferentially along the outer edge, the rotational axis extending through a center of the tool disk; and means for releasably attaching a drum-facing side of the tool disk to the negator spring output drum. The distal end of each tool handle is insertable into any of the handle slots of the tool disk to rotate the tool disk in a circumferential direction around the rotational axis.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 6A shows a view of the negator spring tool.

FIG. 6B shows another view of the negator spring tool.

DETAILED DESCRIPTION

Overview

Figure 1:
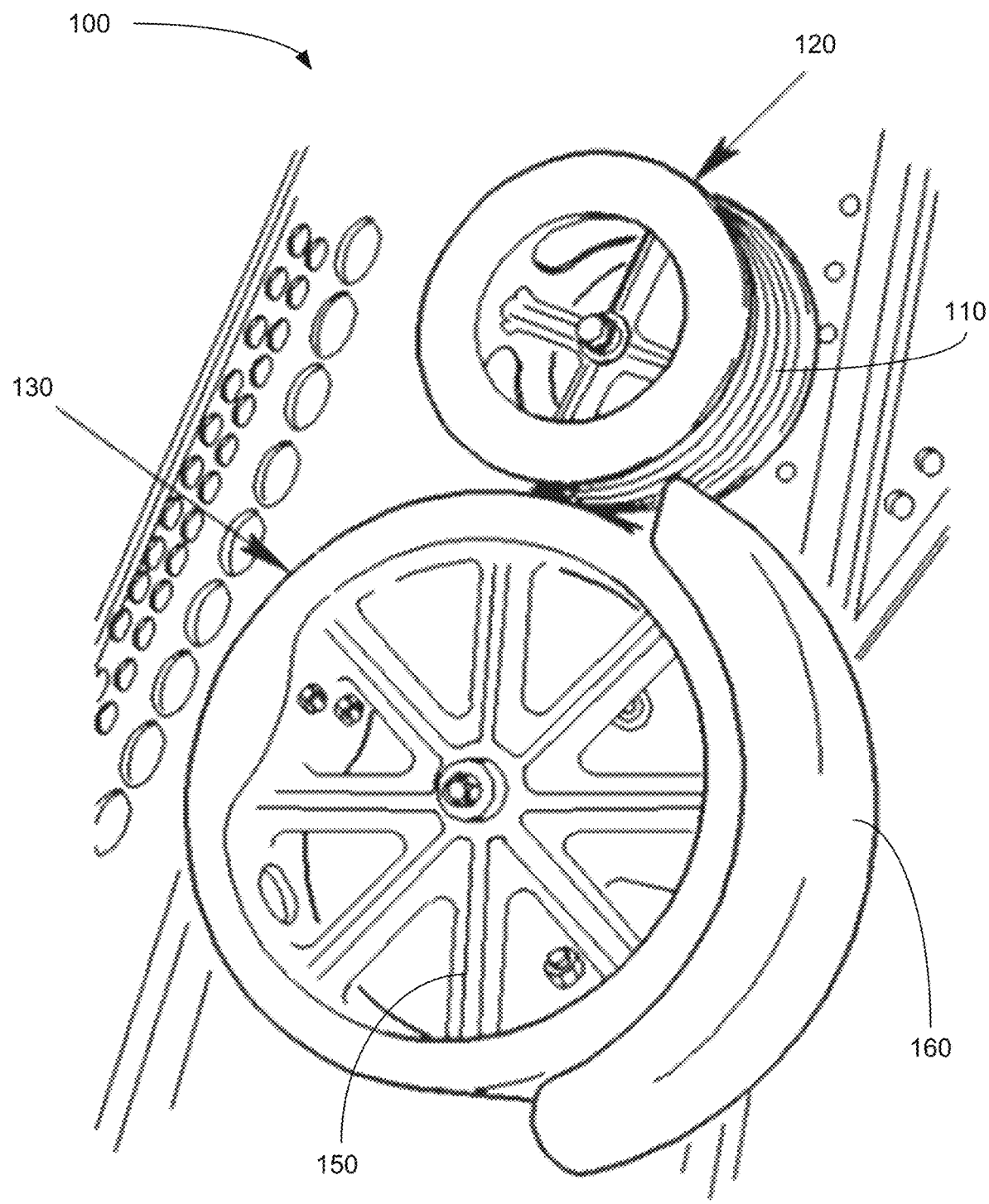
FIG. 1 shows an example of a negator spring assembly for a paratroop door.

FIG. 1 shows an example of a negator spring assembly 100 for a paratroop door. The assembly 100 includes a negator spring 110 wrapped around a storage drum 120 and installed by winding on a negator spring output drum 130, which includes a plurality of radial spokes 150. A negator spring guard 160 is installed to protect an outwardly exposed portion of the output drum 130 and the negator spring 110 installed thereon.

Figure 2:
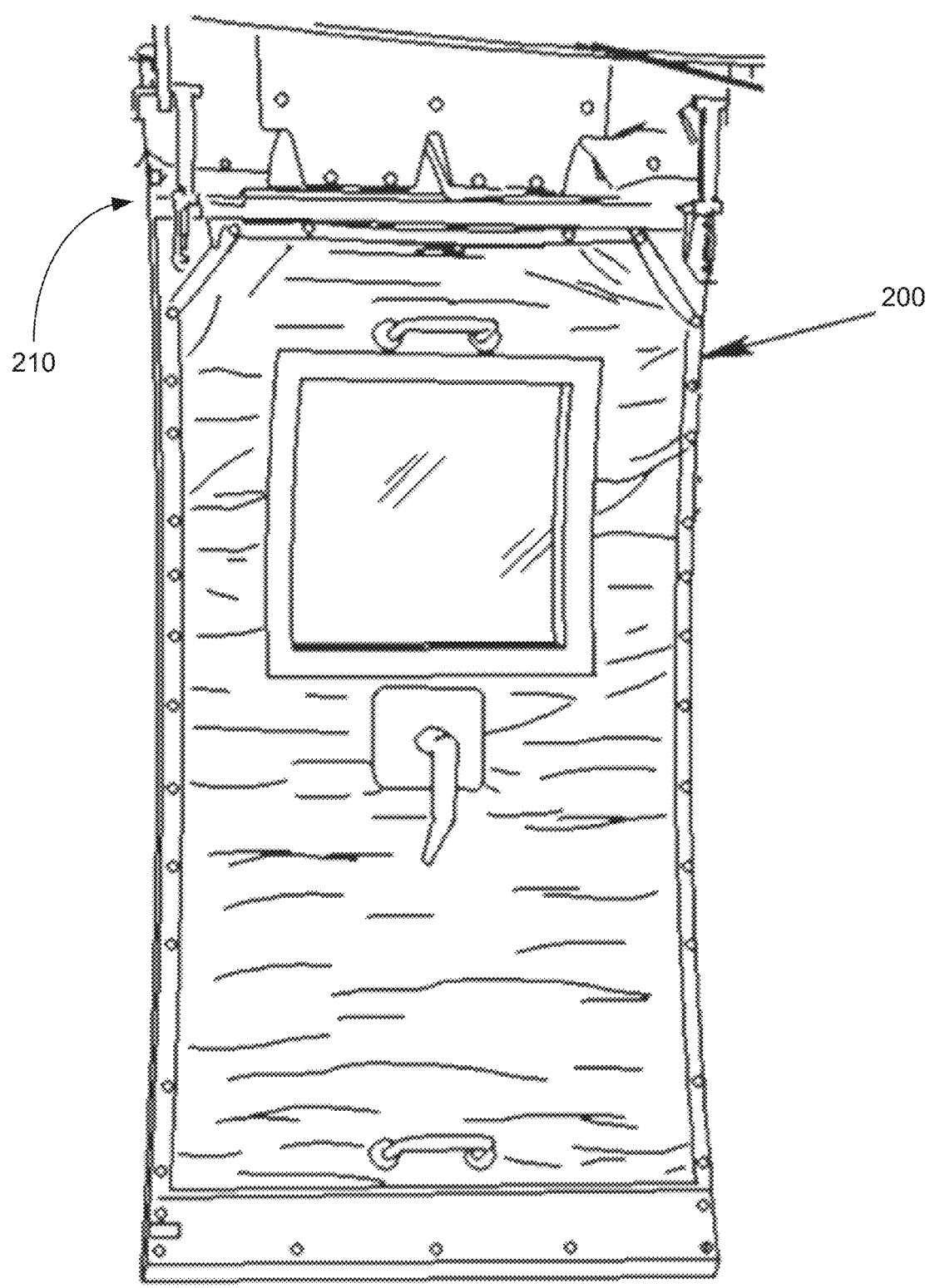
FIG. 2 shows an example of a paratroop door.
Figure 7:
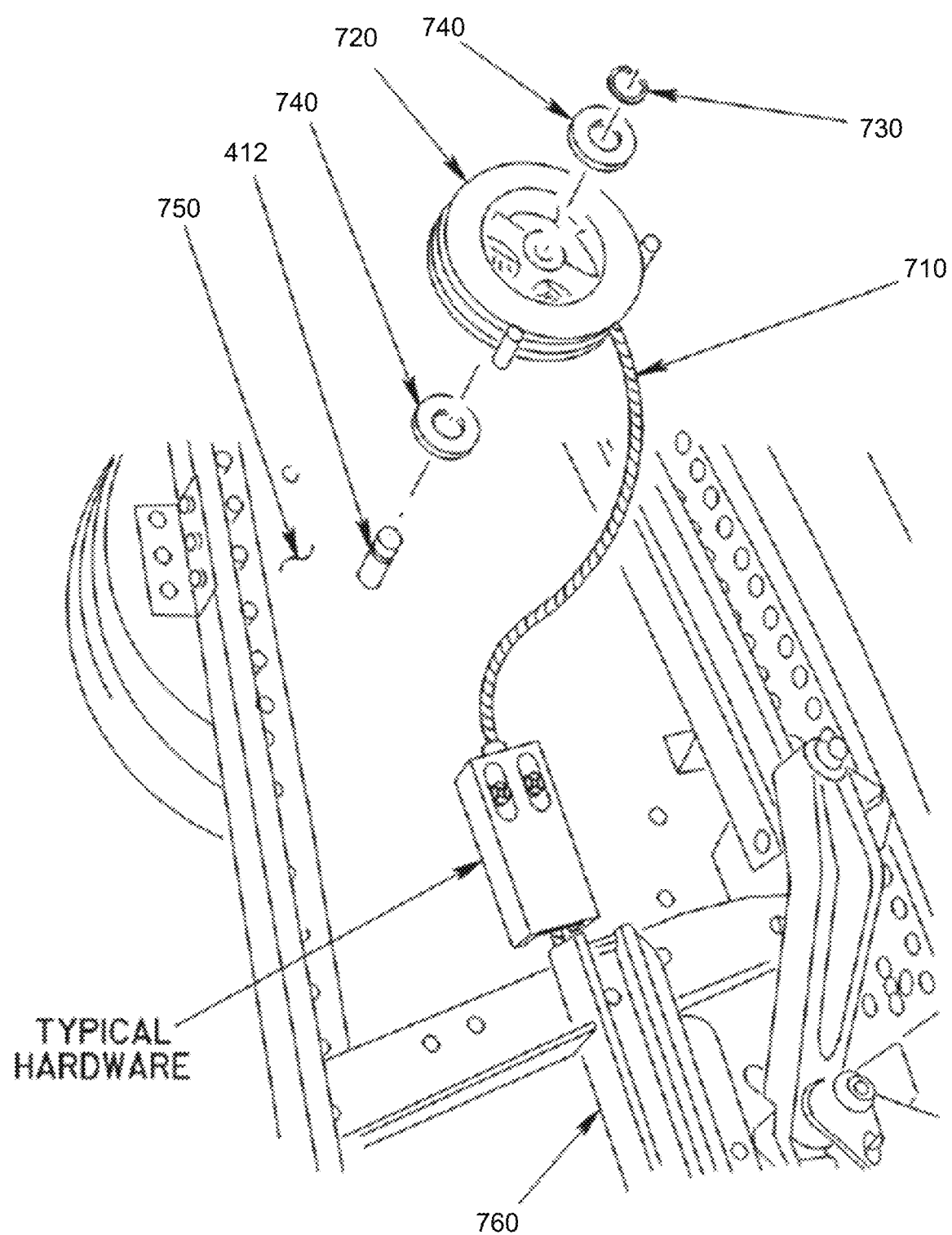
FIG. 7 illustrates an example of installing a negator cable and a cable pulley.
Figure 13:
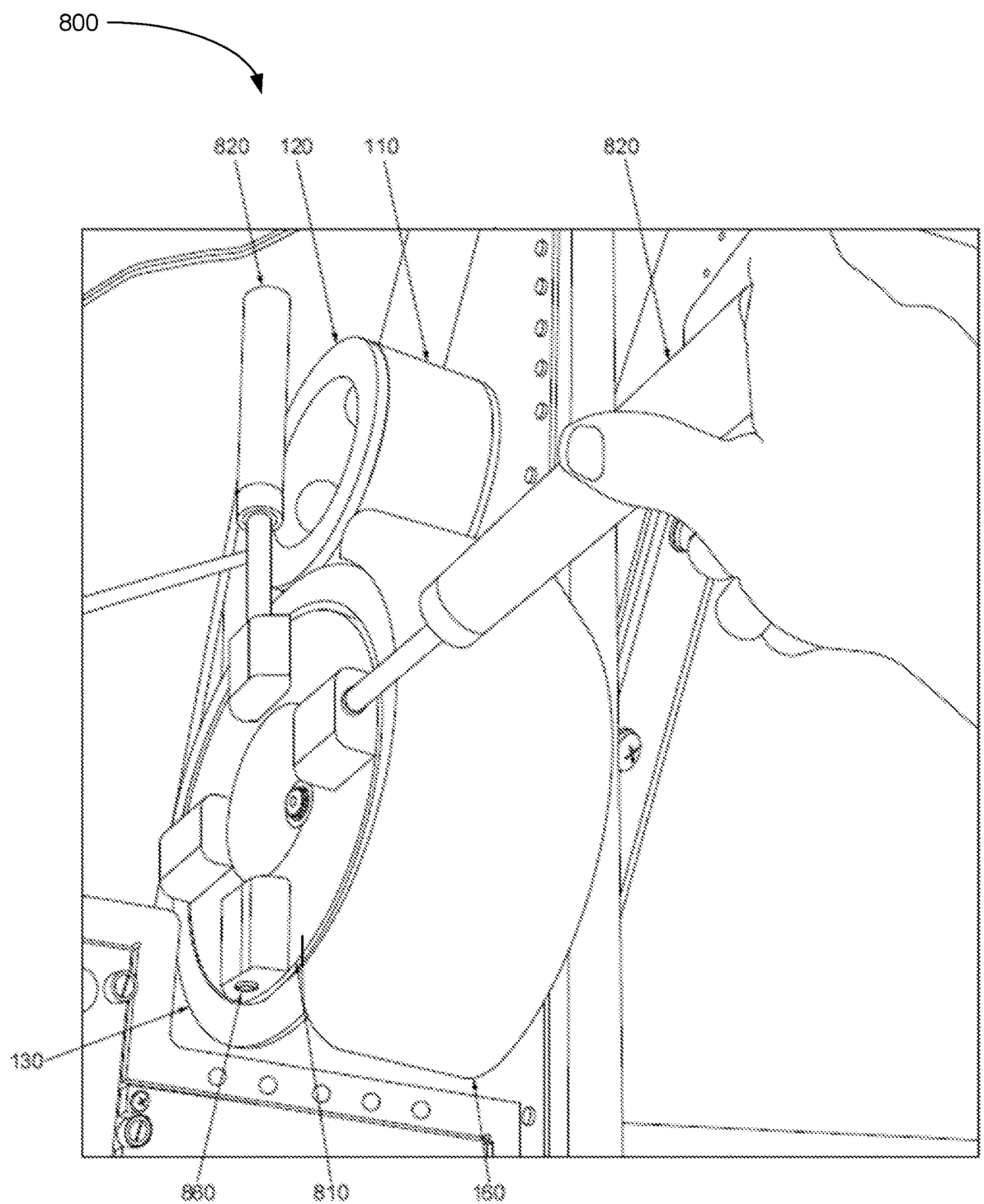
FIG. 13 illustrates using the negator spring tool of FIG. 8 to wind or unwind a negator spring.

FIG. 2 shows an example of a paratroop door 200 (LH (left hand) side shown, RH (right hand) side similar). The negator spring assembly 100 is a paratroop door negator spring counterbalance mechanism which is mounted at location 210 to engage a cable pulley and a negator cable for providing negator spring counterbalance to the paratroop door 200 and making it easier to raise the paratroop door 200 from a closed position to an open position. The location 210 is the approximate location. The negator spring assembly 100 and the paratroop door 200 are separated by a brace or wall, as seen in FIGS. 7 and 13.

Figure 3:
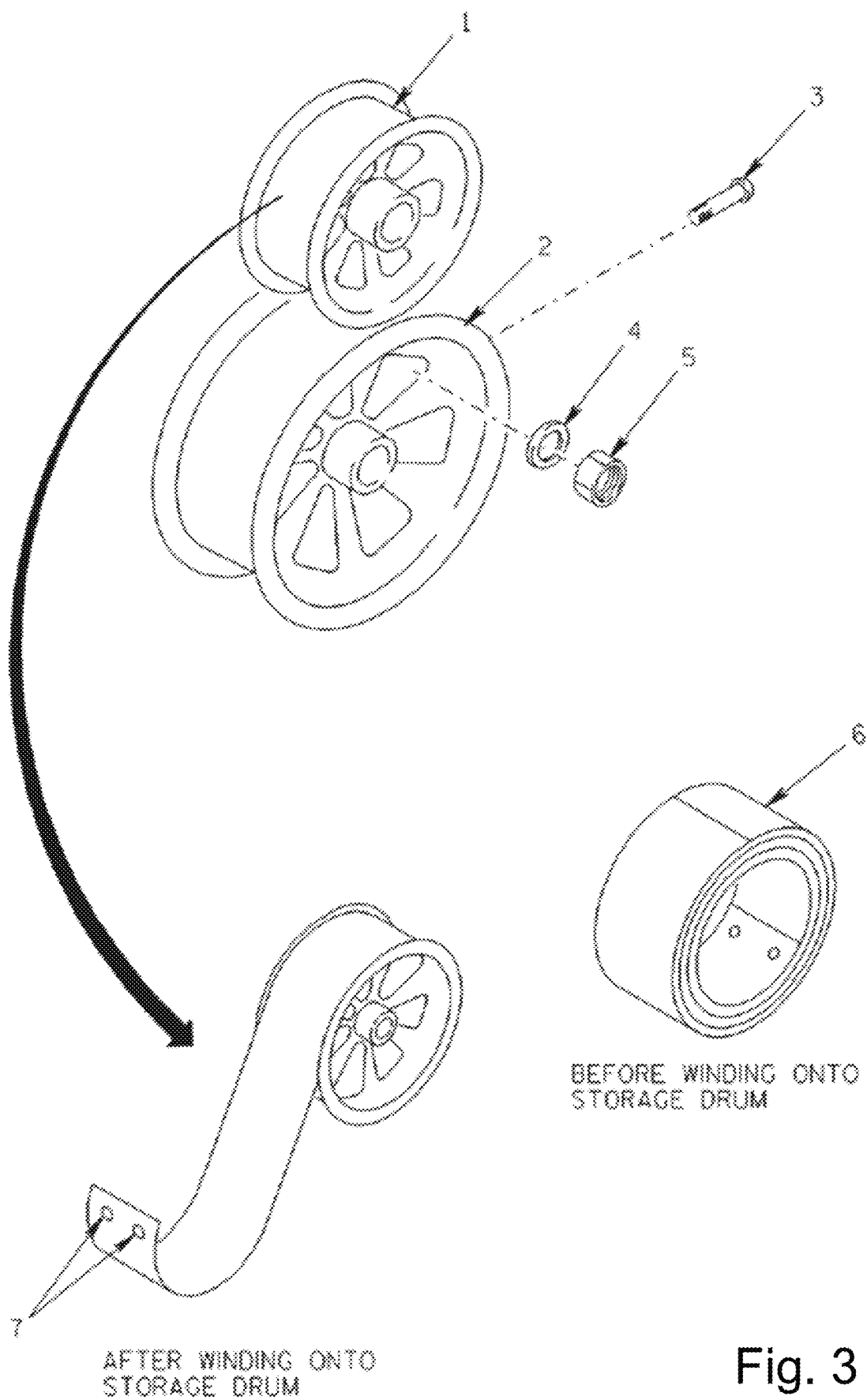
FIG. 3 shows an exploded view of the negator spring assembly of FIG. 1.

FIG. 3 shows an exploded view of the negator spring assembly 100 of FIG. 1. It includes a storage drum 1, an output drum 2, a pair of screws 3, a pair of washers 4, a pair of nuts 5, a negator spring 6, and a pair of attachment screw holes 7. The paratroop door negator spring counterbalance mechanism or negator spring assembly 100 is installed by first installing the negator spring 6 onto the storage drum 1 and then attaching the negator spring 6 on the storage drum 1 to the output drum 2.

To install the negator spring 6 onto the storage drum 1: (1) ensure that the attachment screw holes 7 of the negator spring 6 are on the inside of the coil (If the attachment screw holes 7 are on the outside, then recoil the recoil negator spring 6 so that the attachment screw holes 7 are on the inside); (2) wrap the negator spring 6 around the storage drum 1 one and one-quarter times and mark the negator spring 6, and wrap the LH negator spring clockwise around the storage drum (looking forward as if installed) or wrap the RH negator spring counterclockwise around the storage drum (looking forward as if installed); and (3) wrap the remainder of the negator spring 6 onto the storage drum 1.

To attach the negator spring 6 on the storage drum 1 to the output drum 2: (1) bend the end of the negator spring 6 backwards onto the output drum 2; and (2) insert two screws 3 through the attachment screw holes 7 in the negator spring 6 and output drum 2, and secure the negator spring 6 to the output drum 2 with two washers 4 and nuts 5.

Figure 4:
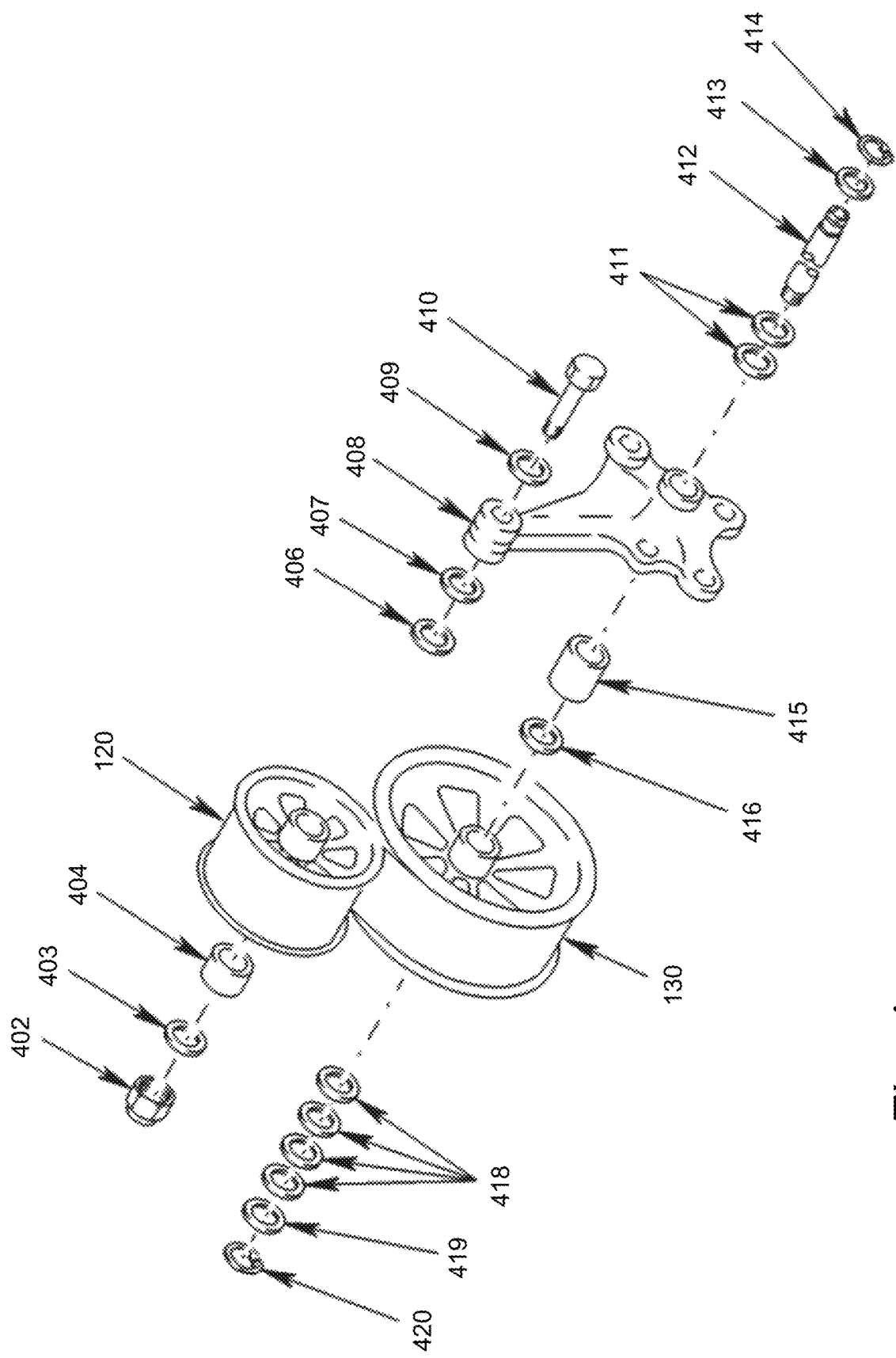
FIG. 4 is an exploded view of the negator spring storage drum and output drum illustrating the installation thereof.

FIG. 4 is an exploded view of the negator spring storage drum and output drum illustrating the installation thereof. The installation of the negator spring storage drum 120 and output drum 130 involves the following steps: (1) confirm that the paratroop door is closed (Four washers are used on the pulley shaft 412 for proper alignment of output drum 130. Additional washers may be required to align the output drum with the negator spring storage drum 120 once installed on the pulley shaft 412); (2) grease bushings 404, 415 and install them in the negator spring storage drum 120 and output drum 130; (3) install the negator spring storage drum 120 and output drum 130 with washers 406, 416, check the alignment of the output drum 130 with the negator spring storage drum 120, and add or remove washers as required to align the drums 120, 130; (4) secure the negator spring storage drum 120 to a fitting 408 with a bolt 410, washers 409, 407, 403, and nut 402; (5) install the pulley shaft 412, four washers 418, another washer 419, and a retainer ring 420; and (6) install washers 411, 413 and a retainer ring 414 on the pulley shaft 412.

Referring to FIG. 1, to check the installation of the negator spring 110 on the negator spring output drum 130, the paratroop door is raised to the fully open and locked position. The negator spring output drum 130 is rotated to ensure that approximately one and one-quarter wraps of the negator spring 110 is wrapped on the negator spring output drum 130 when the paratroop door is in the fully open position.

Figure 5:
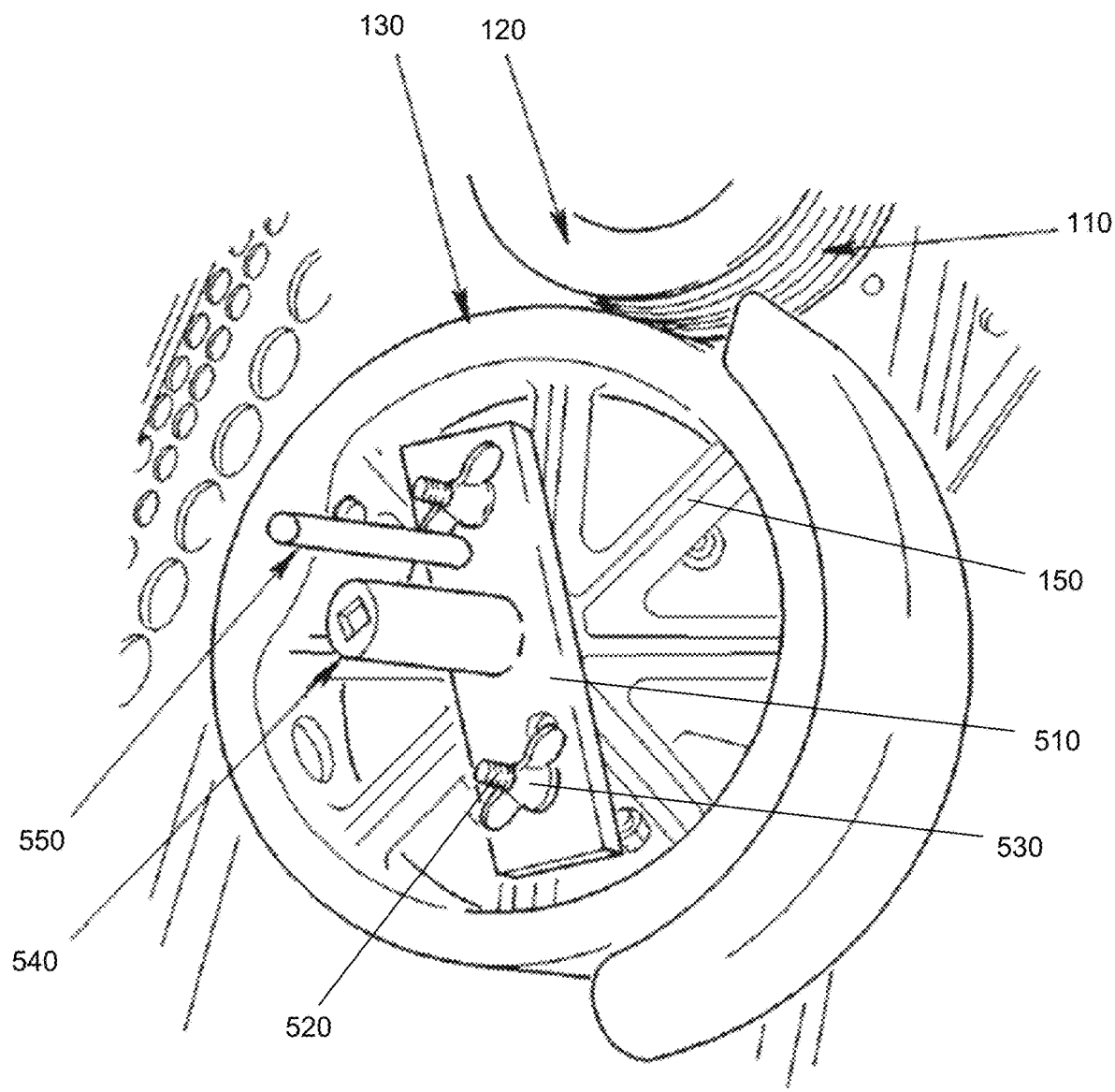
FIG. 5 illustrates winding of the negator spring onto the negator spring output drum using a negator spring tool.

FIG. 5 illustrates winding of the negator spring 110 onto the negator spring output drum 130 using a negator spring tool. FIGS. 6A and 6B show different views of the negator spring tool which includes a tool plate or tool disk 510, two J-shaped tool hooks 520 and two corresponding tool nuts 530, and a locking pin 550. The tool disk 510 has a tool socket 540 extending from a center of the tool disk 510 and a tool hole 610 for receiving the locking pin 550. The winding process involves the following: (1) install the negator tool on the negator spring output drum 130 by mounting the tool disk 510 across the output drum 130 using two J-shaped tool hooks 520 which engage two of the plurality of radial spokes 150 on the output drum 130 and two corresponding tool nuts 530 threadingly tightening the tool hooks 520, with the tool socket 540 extending from a center of the tool disk 510 which is generally aligned with the center of the output drum 130; (2) while maintaining at least one and one-quarter wraps of the negator spring 110 on the negator spring storage drum 120 to prevent the negator spring 110 from slipping off of the storage drum 120, rotate the negator spring output drum 130 until one and one-quarter wraps of the negator spring 110 remain on the negator spring storage drum 120, wherein rotating the output drum 130 involves rotating the tool disk 510 via the tool socket 540 using a ratchet or bar that engages the tool socket 540 (This step involves rotating a LH negator spring output drum counterclockwise (looking forward) or rotating a RH negator spring output drum clockwise (looking forward)); and lock the negator spring tool disk 510 in place by inserting a locking pin 550 through the negator spring tool hole 610 and a vacant bolt hole in the negator housing. To wind/unwind the negator spring 110, two people are required.

FIG. 7 illustrates an example of installing a negator cable 710 and a cable pulley 720. During the installation process, it is important to ensure that the negator spring output drum 130 is firmly locked before working on the negator mechanism, since the negator stores considerable energy and could cause injury. The installation process involves the following: (1) remove a retainer ring 730 and washers 740 from the pulley shaft 412; (2) attach the negator cable 710 to the cable pulley 720 and wind the negator cable 710 in tension onto the cable pulley 720 by rotating the cable pulley 720 until all slack is out of the negator cable 710, and rotate a LH cable pulley counterclockwise (looking aft) or rotate a RH cable pulley clockwise (looking aft); (3) install washers 740 and the cable pulley 720 onto the pulley shaft 412 and secure with a retainer ring 730, and use washers as required between the cable pulley 720 and a fitting assembly 750, to align the negator cable 710 with a lower aft track 760.

Referring to FIG. 1, after the above installations are completed, the installation of the negator spring 110 on the negator spring output drum 130 is checked to ensure proper operation. The procedure is as follows: (1) raise the paratroop door 200 to the fully open and locked position; and (2) ensure approximately one and one-quarter wraps of the negator spring 110 is wrapped on the negator spring output drum 130 when the paratroop door 200 is open. The negator spring guard 160 can be installed to protect the outwardly exposed portion of the output drum 130 and the negator spring installed thereon.

Example Scenario

Although the preceding overview section describes an approach to maintenance that avoids injury to maintenance personnel, an approach enabled by the inventive negator spring tool mentioned in the subsequent section does so using one person instead of two, and in fewer steps.

Embodiments

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figure 8:
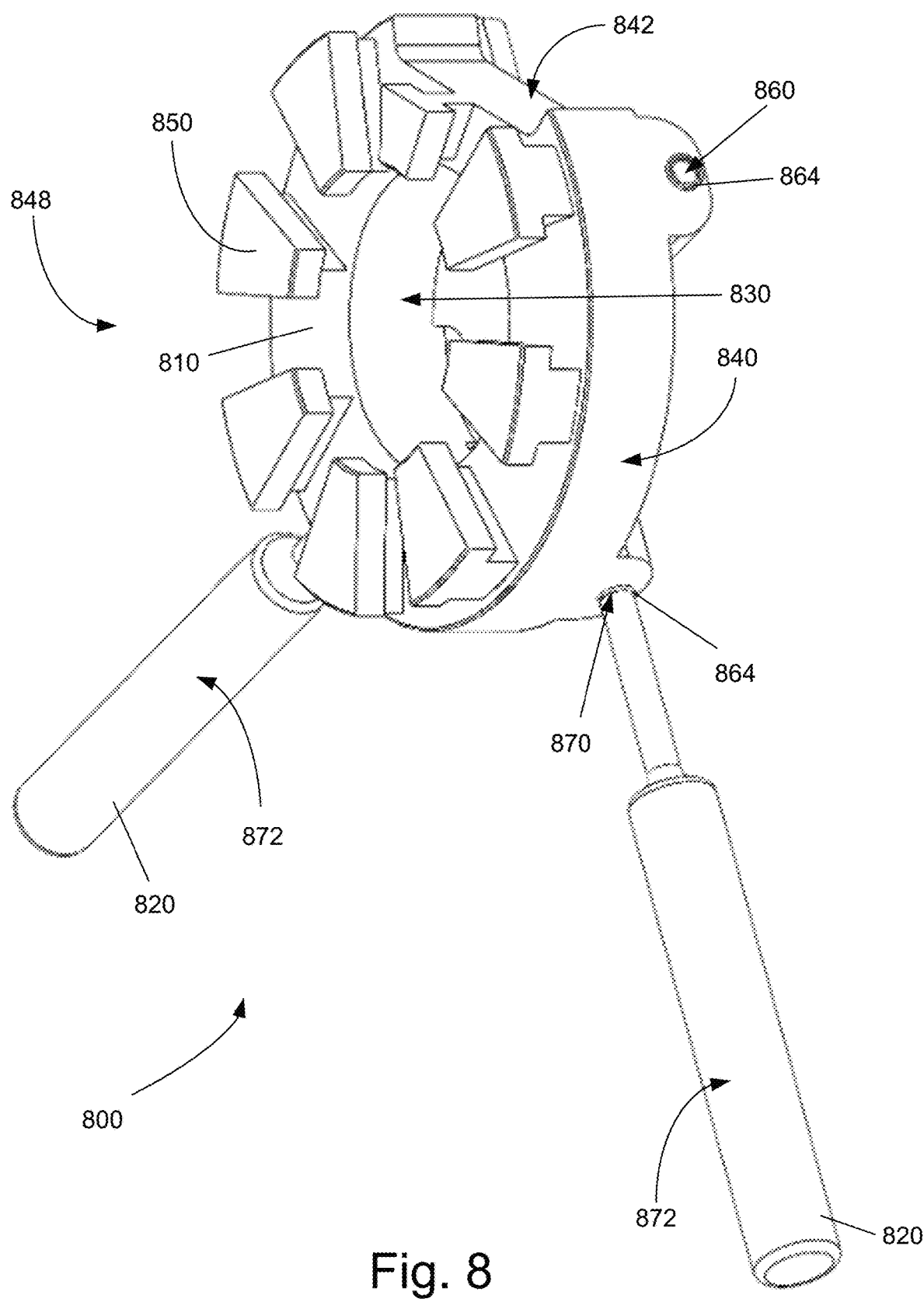
FIG. 8 is a front perspective view of a negator spring tool according to an embodiment.
Figure 9:
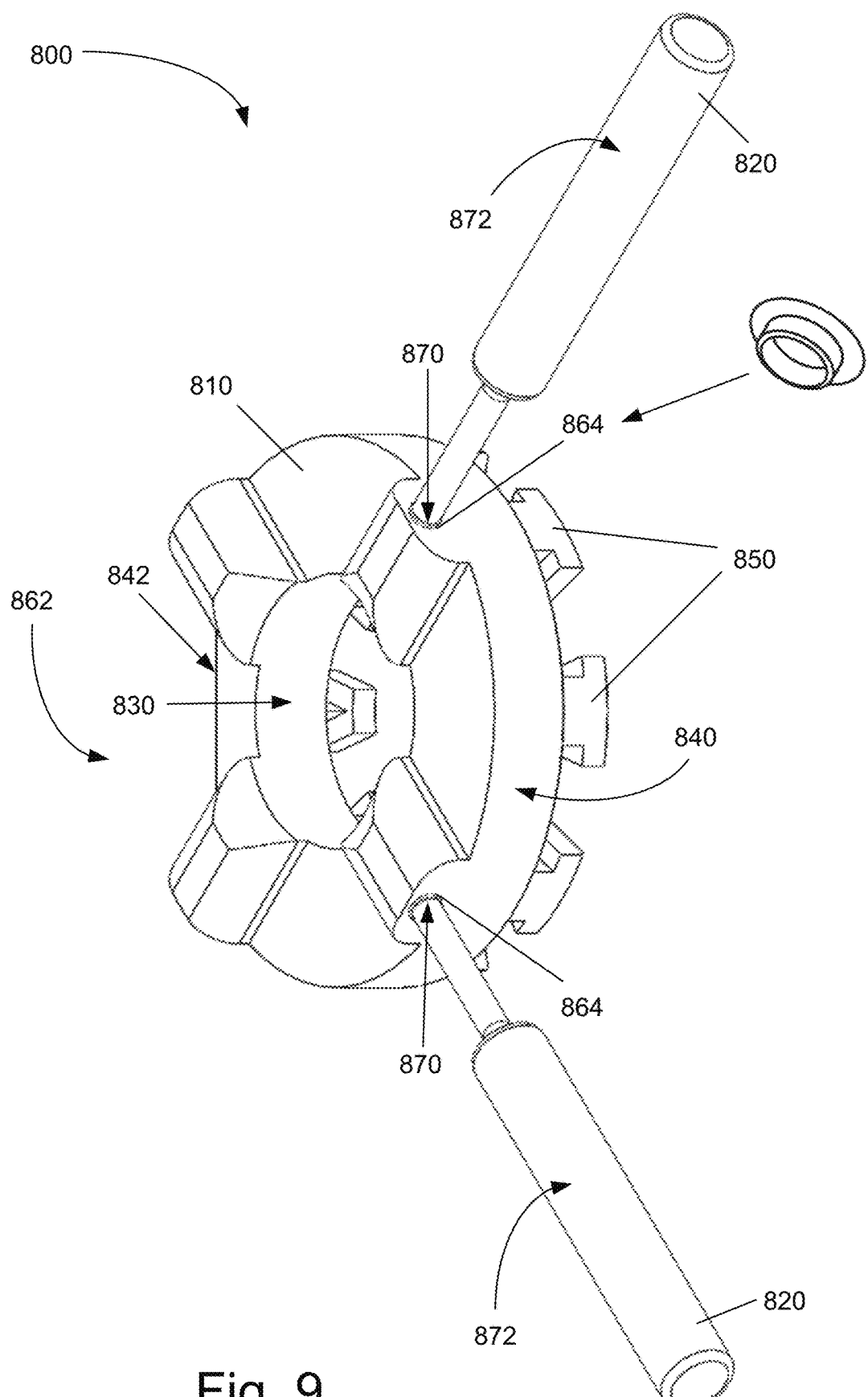
FIG. 9 is a rear perspective view of the negator spring tool of FIG. 8.
Figure 10:
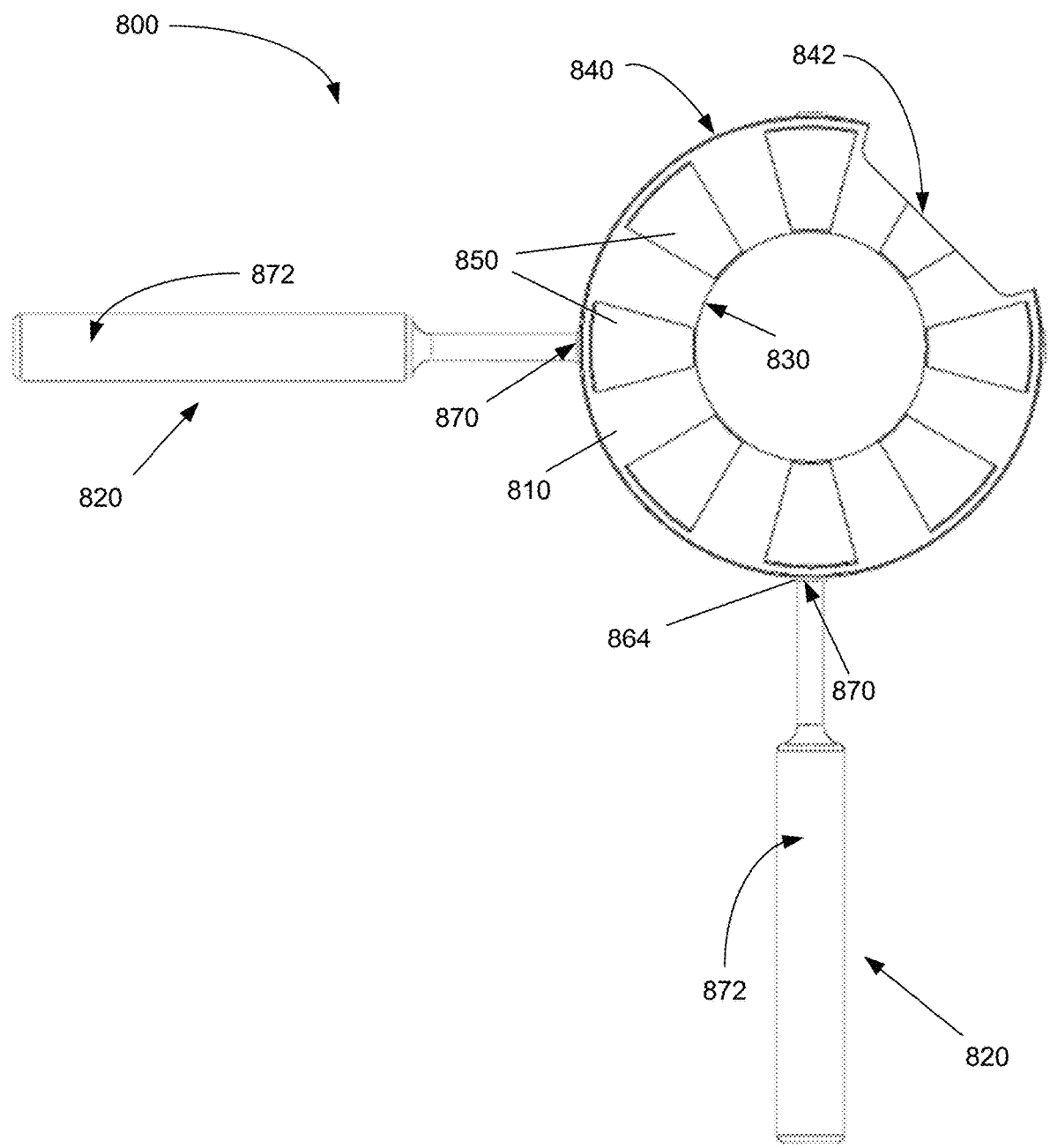
FIG. 10 is a front elevational view of the negator spring tool of FIG. 8.
Figure 11:
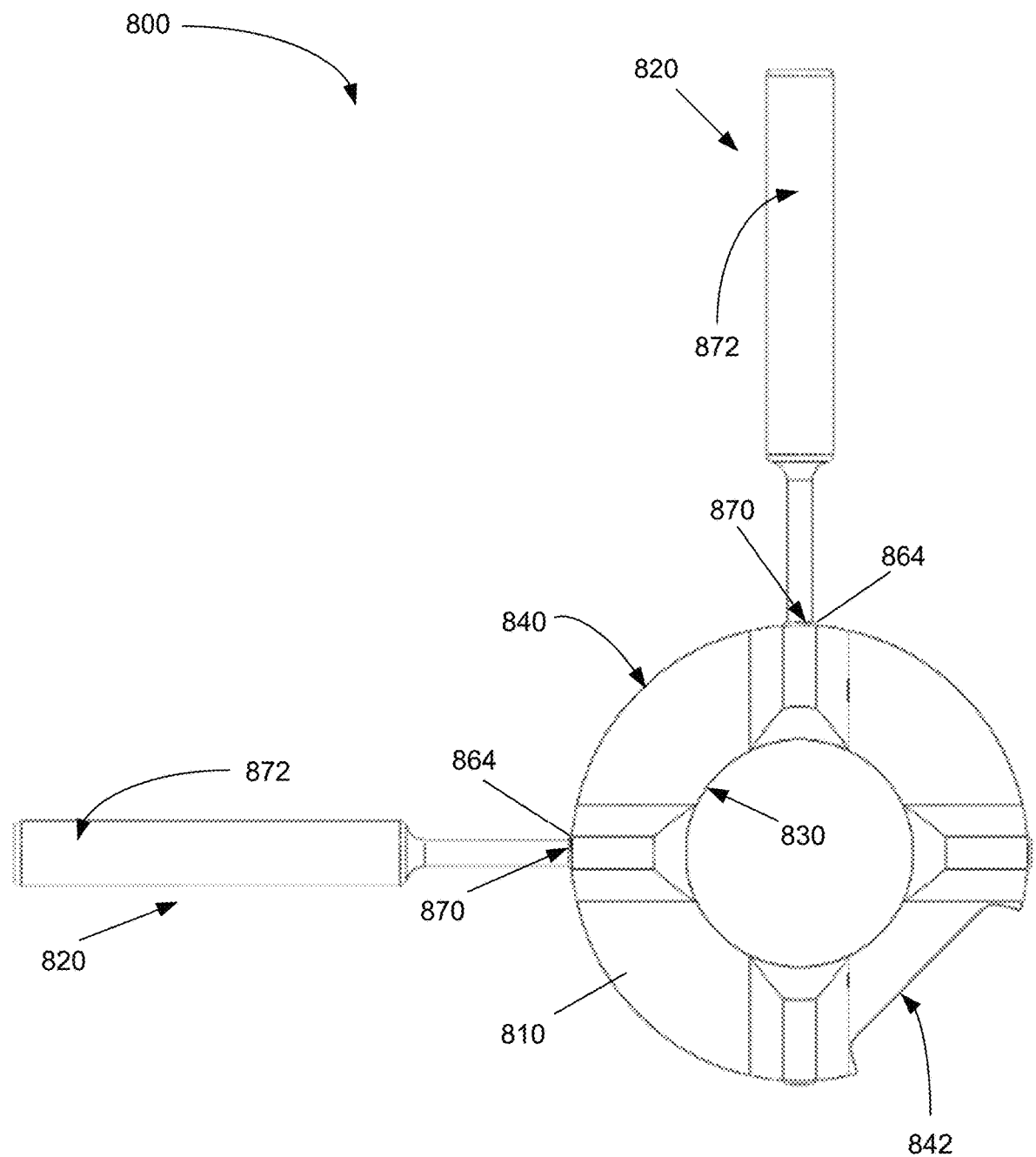
FIG. 11 is a rear elevational view of the negator spring tool of FIG. 8.
Figure 12:
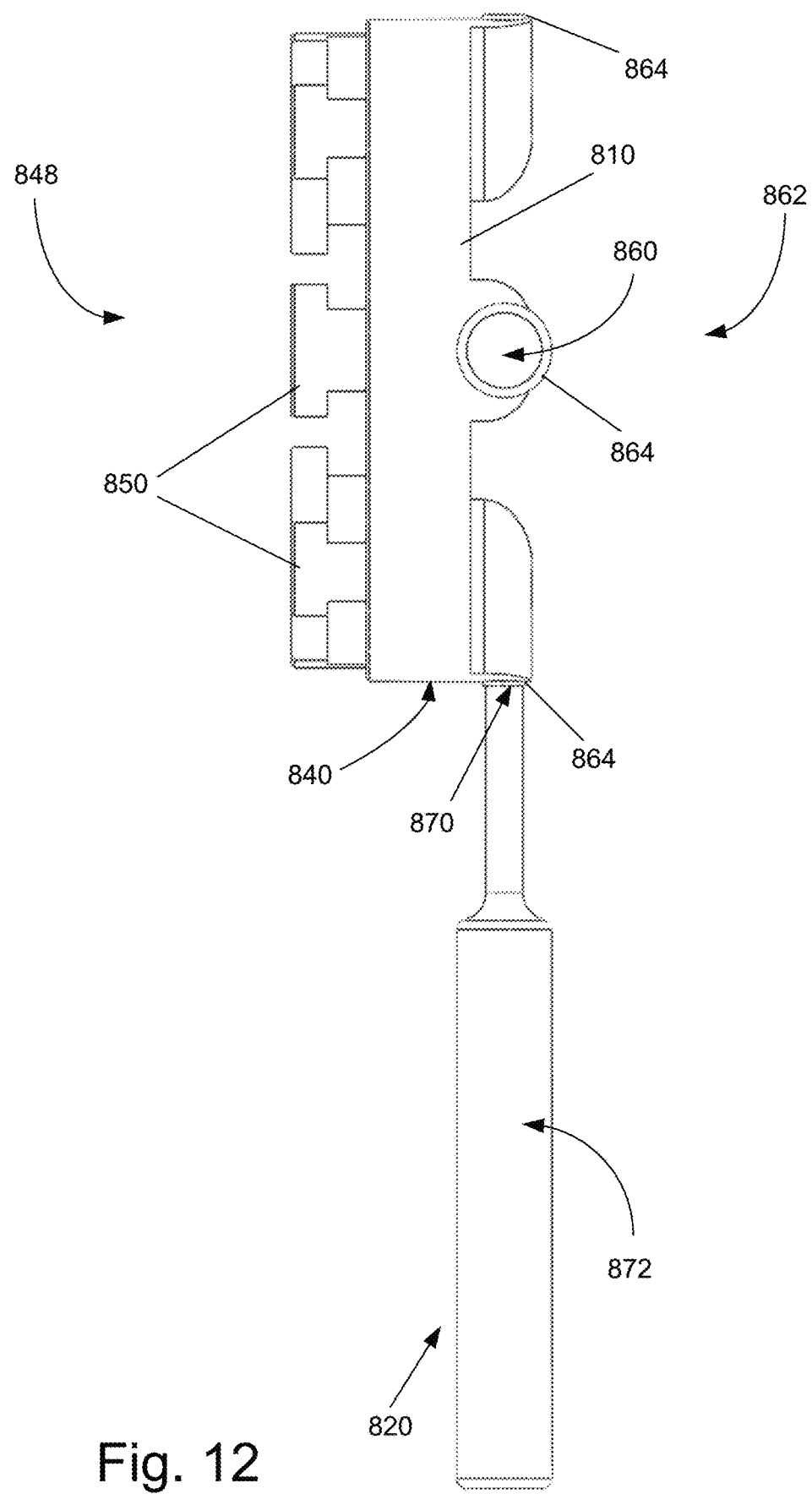
FIG. 12 is a side elevational view of the negator spring tool of FIG. 8.

FIG. 8 is a front perspective view of a negator spring tool according to an embodiment. FIG. 9 is a rear perspective view thereof. FIG. 10 is a front elevational view thereof. FIG. 11 is a rear elevational view thereof. FIG. 12 is a side elevational view thereof.

The negator spring tool 800 includes a tool disk 810 and a pair of tool handles 820. The tool disk 810 has an inner edge 830 and an outer edge 840 with a cutout 842. The inner edge 830 and outer edge 840 may be generally circular. The cutout forms a portion of the outer edge as a cutout edge portion 842 of the outer edge 840. The tool disk 810 is configured to be releasably attached to the negator spring output drum 130. The drum-facing side (front side) 848 of the tool disk 810 includes a plurality of teeth 850 arranged circumferentially to engage the radial spokes 150 of the output drum 130. The teeth 850 protrude from the drum-facing side 848 of the tool disk 810. The protruding teeth 850 each have a T-shaped cross section with flanges extending in two opposite circumferential directions to engage the radial spokes 150, when the protruding teeth 850 are pushed into the interior of the output drum 130 in a direction along the rotational axis and the tool disk 810 is rotated in either circumferential direction around the pulley shaft 412 which extends through the center of the output drum 130 along a rotational axis that extends through the center of the tool disk 810 and the axis of the pulley shaft. One of the two flanges of each T-shaped protruding tooth 850 engages the radial spoke 150 on one side for clockwise rotation (rotation in the clockwise direction), and the other one of the two flanges engages the radial spoke 150 on the other side for counter-clockwise rotation (rotation in the counter-clockwise direction). The protruding teeth 850 provide an example of a mechanism or means for releasably attaching the tool disk 810 to the negator spring output drum 130.

At the outer edge 840 of the tool disk 810 are a plurality of handle slots 860. The handle slots 860 may be spaced apart circumferentially approximately evenly along the outer edge 840 not including the cutout edge portion 842. The handle slots 860 may be disposed in an offset manner away from the teeth 850 on the drum-facing side (front side) 848 toward an opposite tool handle engagement side (rear side) 862. This offset allows the tool handles 820 to be inserted into the handle slots 860 after the protruding teeth of the tool disk 810 are pushed into the interior of the output drum 130 and the tool disk 810 is positioned partially inside the output drum 130, as the offset handle slots 860 remain exposed outside the interior of the output drum 130.

Each tool handle 820 has a distal end 870 that can be inserted into any of the handle slots 860 of the tool disk 810 to manipulate the tool disk 810. The distal end 870 is configured to mate or couple with the handle slot 860 to rotate the tool disk 810 in the circumferential directions (clockwise direction and counterclockwise direction) around the rotational axis. In a specific embodiment, each handle slot 860 has a bushing 864 press fitted therein for receiving the distal end 870 of any of the tool handles 820. The bushing 864 inside the handle slot 860 provides additional support for the coupling with the distal end 870 of the tool handle 820. In the embodiment shown, the distal end 870 has a circular cylindrical shape. In other embodiments, the distal end 870 may have other shapes or may include a socket to mate or couple with a head bolt disposed inside the handle slot 860. Each tool handle 820 may have a knurled proximal portion 872 for increased grip by a user's hand. In the embodiment shown, the tool disk 810 has four handle slots 860 which are approximately 90° apart. In other embodiments, the tool disk 810 may have only three handle slots 860 which are approximately 120° apart or may have additional handle slots (three or more handle slots 860). Two tool handles 820 are used to rotate the tool disk 810 which in turn rotates the negator spring output drum 130 to wind or unwind the negator spring.

FIG. 13 illustrates using the negator spring tool 800 of FIG. 8 to wind or unwind a negator spring 110. The embodiment of the negator spring tool 800 as shown is for a C-130 paratroop door 200. The tool disk 810 is moved partially into the negator spring output drum 130 by pushing the drum-facing side 848 having the protruding teeth 850 into the interior of the output drum 130 in the direction of the pulley shaft 412 along the rotational axis and engage the plurality of teeth 850 of the tool disk 810 with the radial spokes 150 of the output drum 130. The handle slots 860 are disposed in an offset manner away from the teeth 850 on the drum-facing side 848 toward the opposite tool handle engagement side 862. The offset allows the tool handles 820 to be inserted into the handle slots 860 after the tool disk 810 is pushed toward the output drum 130 and is positioned partially inside the output drum 130, as the offset handle slots 860 remain exposed outside the interior of the output drum 130.

The output drum 130 can be rotated in one direction to wind the negator spring 110 in tension or in the opposite direction to unwind the negator spring 110. Once the tool disk 810 is partially inserted into the output drum 130 and the teeth 850 are engaged with the spokes 150, the operator or user has both hands free and can use both hands to operate the two tool handles 820 to rotate the tool disk 810. As such, only one person is required to operate the negator spring tool 800 to wind or unwind the negator spring 110, without assistance from another person.

To rotate the tool disk, the distal end 870 of a first tool handle 820 is releasably inserted into a first handle slot 860 of the tool disk 810 and the first tool handle to rotate the tool disk 810 and the output drum 130 in a circumferential direction around the rotational axis. The distal end of a second tool handle 820 is releasably inserted into a second handle slot 860 of the tool disk (the next handle slot). The distal end of the first tool handle is removed from the first handle slot of the tool disk. The second tool handle is used to rotate the tool disk and the output drum in the circumferential direction around the rotational axis. If more rotation is needed or desired, the distal end of the first tool handle is releasably inserted into a third handle slot (the next handle slot) of the tool disk. The distal end of the second tool handle is removed from the second handle slot of the tool disk. The first tool handle is used to rotate the tool disk and the output drum in the circumferential direction around the rotational axis. The process may be repeated to continue rotating the tool disk 810 in the circumferential direction or be performed in reverse to rotate the tool disk 810 in an opposite circumferential direction.

The winding or unwinding of the negator spring 110 is done incrementally, for instance, by about 90° each time for the embodiment shown according to the approximately 90° spacing of the handle slots 860. After each incremental rotation, one handle 820 is pulled out of the handle slot 860 and inserted into the next open handle slot 860 (which is about 180° on the opposite side of the tool disk 810 in the embodiment shown). The negator spring 110 stores energy during winding and unwinding and the stored energy can be quite large. To prevent catastrophic release of the stored energy, the user keeps at least one tool handle 820 under hand grip at all times to maintain control of the winding position of the negator spring 110. It enables safe and easy winding or unwinding as well as safe installation or removal of the negator spring 110.

The cutout 842 of the outer edge 840 may be positioned to provide spatial clearance so as to allow the protruding teeth 850 of the tool disk 810 to be pushed into the interior of the output drum 130 and the tool disk 810 to be rotated by the tool handles 820 without structural interference. For example, the cutout 842 may be used to clear a protrusion of the output drum 130 and other components such as an electronic box located near the negator spring assembly, so as to avoid interference during operation of the negator spring tool 800. In the specific embodiment shown, the cutout 842 extends approximately linearly between two adjacent handle slots 860 located about 90° apart on the outer edge 840. This provides a generally linear cutout edge portion 842 of the outer edge 840, as best seen in FIGS. 8-11.

Figure 14:
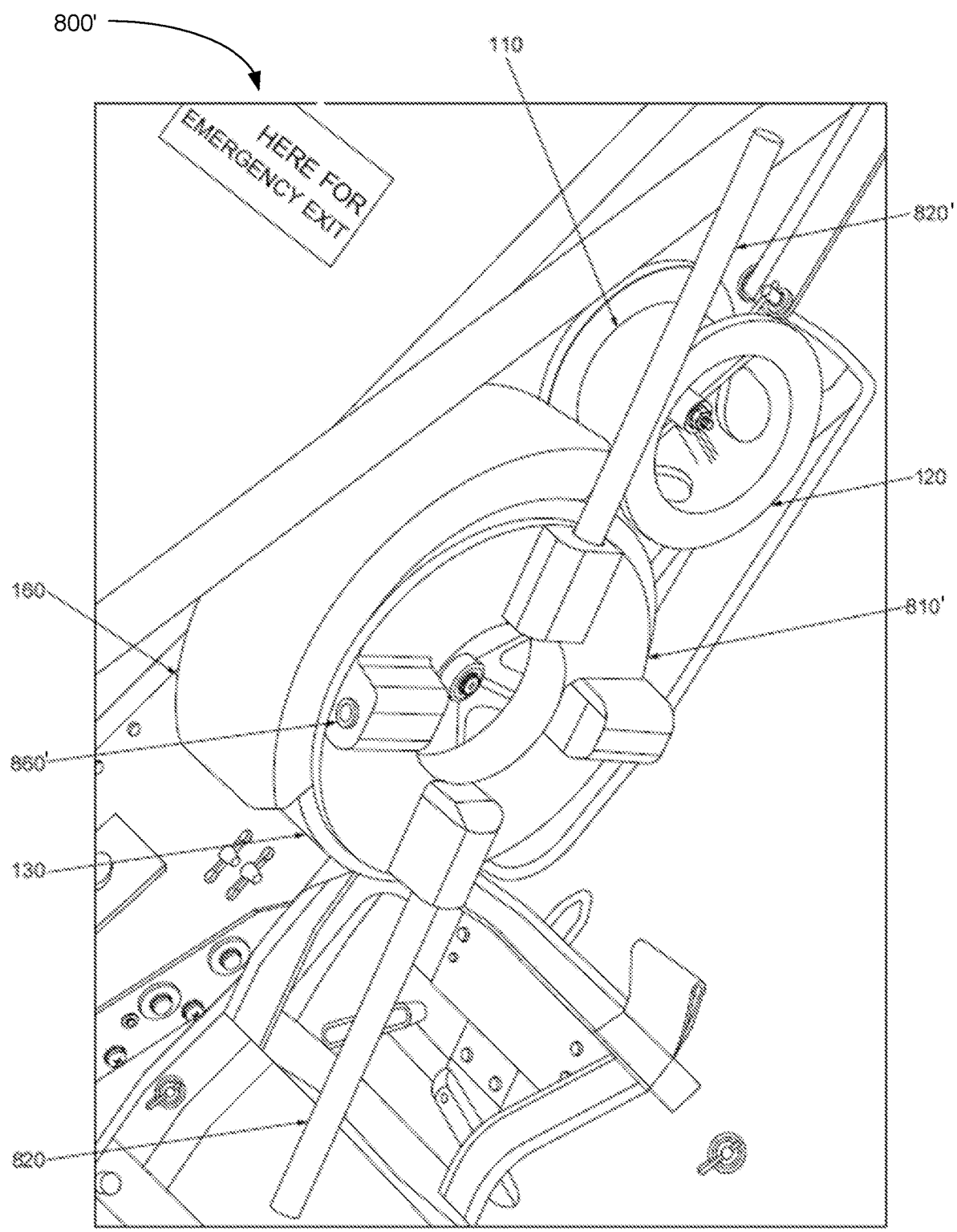
FIG. 14 illustrates using a negator spring tool according to another embodiment to wind or unwind a negator spring.

FIG. 14 illustrates using a negator spring tool 800' according to another embodiment to wind or unwind a negator spring 110. This embodiment of the negator spring tool 800' is similar to the negator spring tool 800 of FIGS. 8 and 13. The tool disk 810' is moved partially into the negator spring output drum 130 by pushing the drum-facing side having the protruding teeth into the interior of the output drum 130'. The handle slots 860' are disposed in an offset manner away from the teeth on the drum-facing side toward the opposite tool handle engagement side. The offset allows the tool handles 820' to be inserted into the handle slots 860' after the tool disk 810' is pushed toward the output drum 130 and is positioned partially inside the output drum 130, as the offset handle slots 860' remain exposed outside the interior of the output drum 130.

The operation of the negator spring tool 800' of FIG. 14 is similar to the operation of the negator spring tool 800 of FIG. 13. Once the tool disk 810' is partially inserted into the output drum 130 and the teeth are engaged with the spokes, the operator or user has both hands free and can use both hands to operate the two tool handles 820' to rotate the tool disk 810'. The output drum 130 can be rotated in one direction to wind the negator spring 110 in tension or in the opposite direction to unwind the negator spring 110. As such, only one person is required to operate the negator spring tool 800' to wind or unwind the negator spring 110, without assistance from another person.

The inventive concepts taught by way of the examples discussed above are amenable to modification, rearrangement, and embodiment in several ways. For example, this invention may be applicable for other doors such as C-27 or P-3 paratroop doors. In addition, the tool disk 810 may include six handle slots 860 which are about 60° apart, or eight handle slots 860 which are about 45° apart, etc. The spacing may range from less than 45° (e.g., 30°) apart to more than 90° (e.g., 120°) apart. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A negator spring tool for winding a negator spring output drum having a plurality of radial spokes around a pulley shaft which extends through a center of the negator spring output drum along a rotational axis, the negator spring tool comprising:
    a pair of tool handles, each tool handle having a distal end; and
    a tool disk having an outer edge which is generally circular except for a cutout forming a portion of the outer edge as a cutout edge portion of the outer edge, the tool disk being configured to be releasably attached to the negator spring output drum, the tool disk having a drum-facing side which includes a plurality of protruding teeth arranged circumferentially and protruding from the drum-facing side to engage the radial spokes when the protruding teeth are pushed into an interior of the negator spring output drum and the tool disk is rotated in either circumferential direction around the rotational axis extending through the center of the negator spring output drum and a center of the tool disk, the outer edge of the tool disk including a plurality of handle slots which are spaced circumferentially along the outer edge;
    the distal end of each tool handle being insertable into any of the handle slots of the tool disk to rotate the tool disk in a circumferential direction around the rotational axis; and
    the protruding teeth of the tool disk each having a T-shaped cross section to engage the radial spokes when the protruding teeth are pushed into the interior of the negator spring output drum in a direction along the rotational axis and the tool disk is rotated in either circumferential direction around the rotational axis, each T-shaped protruding tooth and the drum-facing side forming an I-shaped cross section having two opposite facing U-shaped cavities on two opposite sides of the I-shaped cross section to receive the radial spokes when the protruding teeth are pushed into the interior of the negator spring output drum.

2. The negator spring tool of claim 1,
    wherein each protruding tooth has two flanges extending in two opposite circumferential directions to form the T-shaped cross section to engage the radial spokes when the protruding teeth are pushed into the interior of the negator spring output drum.

3. The negator spring tool of claim 2,
    wherein one of the two flanges is configured to engage one radial spoke on one side of said each protruding tooth for clockwise rotation, and another one of the two flanges is configured to engage another radial spoke on another side of said each protruding tooth for counter-clockwise rotation.

4. The negator spring tool of claim 1,
    wherein the plurality of handle slots of the tool disk are disposed in an offset manner away from the protruding teeth on the drum-facing side toward an opposite tool handle engagement side of the tool disk, to be exposed outside the interior of the negator spring output drum to allow the tool handles to be inserted into the handle slots, after the protruding teeth of the tool disk are pushed into the interior of the negator spring output drum and the tool disk is positioned partially inside the negator spring output drum.

5. The negator spring tool of claim 1,
    wherein the tool disk has three or more handle slots which are spaced apart circumferentially approximately evenly along the outer edge not including the cutout edge portion.

6. The negator spring tool of claim 1,
    wherein the tool disk has four handle slots which are spaced apart circumferentially by approximately 90°.

7. The negator spring tool of claim 6,
    wherein the cutout extends approximately linearly between two adjacent handle slots located about 90° apart on the outer edge, forming a generally linear cutout edge portion of the outer edge.

8. The negator spring tool of claim 1,
    wherein the handle slots of the tool disk each have a bushing press-fitted therein for receiving the distal end of any of the tool handles.

9. A method for winding a negator spring output drum having a plurality of radial spokes around a pulley shaft which extends through a center of the negator spring output drum along a rotational axis, the method comprising:
    releasably attaching a drum-facing side of a tool disk to the negator spring output drum, the tool disk having an outer edge which is generally circular except for a cutout forming a portion of the outer edge as a cutout edge portion of the outer edge, the drum-facing side including a plurality of protruding teeth arranged circumferentially and protruding from the drum-facing side to engage the radial spokes when the protruding teeth are pushed into an interior of the negator spring output drum and the tool disk is rotated in either circumferential direction around the rotational axis extending through the center of the negator spring output drum and a center of the tool disk, the outer edge of the tool disk including a plurality of handle slots which are spaced circumferentially along the outer edge;
    releasably inserting a distal end of a first tool handle into a first handle slot of the tool disk and using the first tool handle to rotate the tool disk and the negator spring output drum in a circumferential direction around the rotational axis;
    releasably inserting a distal end of a second tool handle into a second handle slot of the tool disk;
    removing the distal end of the first tool handle from the first handle slot of the tool disk; and using the second tool handle to rotate the tool disk and the negator spring output drum in the circumferential direction around the rotational axis;

releasably attaching the drum-facing side of the tool disk to the negator spring output drum comprising pushing the protruding teeth of the tool disk into the interior of the negator spring output drum and rotating the tool disk in either circumferential direction around the rotational axis, the protruding teeth of the tool disk each have a T-shaped cross section to engage the radial spokes when pushed into the interior of the negator spring output drum and rotated in either circumferential direction around the rotational axis, each T-shaped protruding tooth and the drum-facing side forming an I-shaped cross section having two opposite facing U-shaped cavities on two opposite sides of the I-shaped cross section to receive the radial spokes when the protruding teeth are pushed into the interior of the negator spring output drum.

10. The method of claim 9,
wherein each protruding tooth has two flanges extending in two opposite circumferential directions to form the T-shaped cross section to engage the radial spokes when the protruding teeth are pushed into the interior of the negator spring output drum.

11. The method of claim 10,
wherein the tool disk and the negator spring output drum are rotated in a clockwise direction by moving one of the two flanges of said each protruding tooth to engage one radial spoke on one side of said each protruding tooth for clockwise rotation, and are rotated in a counter-clockwise direction by moving another one of the two flanges of said each protruding tooth to engage another radial spoke on another side of said each protruding tooth for counter-clockwise rotation.

12. The method of claim 9,
wherein the distal end of the first tool handle is releasably inserted into the first handle slot of the tool disk in an offset manner away from the protruding teeth on the drum-facing side toward an opposite tool handle engagement side of the tool disk, the first handle slot being exposed outside the interior of the negator spring output drum to allow the tool handles to be inserted into the handle slots after the protruding teeth of the tool disk are pushed into the interior of the negator spring output drum and the tool disk is positioned partially inside the negator spring output drum.

13. The method of claim 9,
wherein releasably attaching the drum-facing side of the tool disk to the negator spring output drum comprises placing the cutout of the outer edge of the tool disk in a position to provide spatial clearance so as to allow the protruding teeth of the tool disk to be pushed into the interior of the negator spring output drum and the tool disk to be rotated by the tool handles without structural interference.

14. The method of claim 13,
wherein the cutout extends approximately linearly between two adjacent handle slots located about 90° apart on the outer edge, forming a generally linear cutout edge portion of the outer edge.

15. The method of claim 9, further comprising:
releasably inserting the distal end of the first tool handle into a third handle slot of the tool disk;
removing the distal end of the second tool handle from the second handle slot of the tool disk; and
using the first tool handle to rotate the tool disk and the negator spring output drum in the circumferential direction around the rotational axis.

16. A negator spring tool for winding a negator spring output drum having a plurality of radial spokes around a pulley shaft which extends through a center of the negator spring output drum along a rotational axis, the negator spring tool comprising:
a pair of tool handles, each tool handle having a distal end;
a tool disk having an outer edge which is generally circular except for a cutout forming a portion of the outer edge as a cutout edge portion of the outer edge, the outer edge of the tool disk including a plurality of handle slots which are spaced circumferentially along the outer edge, the rotational axis extending through a center of the tool disk; and
a mechanism for releasably attaching a drum-facing side of the tool disk to the negator spring output drum, the mechanism comprising a plurality of protruding teeth arranged circumferentially and protruding from the drum-facing side to engage the radial spokes when the protruding teeth are pushed into an interior of the negator spring output drum and the tool disk is rotated in either circumferential direction around the rotational axis extending through the center of the negator spring output drum and a center of the tool disk, the protruding teeth of the tool disk each having a T-shaped cross section to engage the radial spokes when the protruding teeth are pushed into the interior of the negator spring output drum in a direction along the rotational axis and the tool disk is rotated in either circumferential direction around the rotational axis, each T-shaped protruding tooth and the drum-facing side forming an I-shaped cross section having two opposite facing U-shaped cavities on two opposite sides of the I-shaped cross section to receive the radial spokes when the protruding teeth are pushed into the interior of the negator spring output drum;
the distal end of each tool handle being insertable into any of the handle slots of the tool disk to rotate the tool disk in a circumferential direction around the rotational axis.

17. The negator spring tool of claim 16,
wherein the plurality of handle slots of the tool disk are disposed in an offset manner away from the drum-facing side toward an opposite tool handle engagement side of the tool disk to be exposed outside the interior of the negator spring output drum to allow the tool handles to be inserted into the handle slots after the mechanism for releasably attaching the drum-facing side of the tool disk to the negator spring output drum and the tool disk is positioned partially inside the negator spring output drum.

18. The negator spring tool of claim 16,
wherein the tool disk has four handle slots which are spaced apart circumferentially by approximately 90° to eight handle slots which are spaced apart circumferentially by approximately 45°.

19. The negator spring tool of claim 16,
wherein the cutout extends approximately linearly between two adjacent handle slots located about 90° apart on the outer edge, forming a generally linear cutout edge portion of the outer edge.

20. The negator spring tool of claim 16,
wherein the handle slots of the tool disk each have a bushing press-fitted therein for receiving the distal end of any of the tool handles.

* * * * *